No. 796,894. PATENTED AUG. 8, 1905.
J. BUTLER.
TIRE AND RIM.
APPLICATION FILED JAN. 10, 1905.
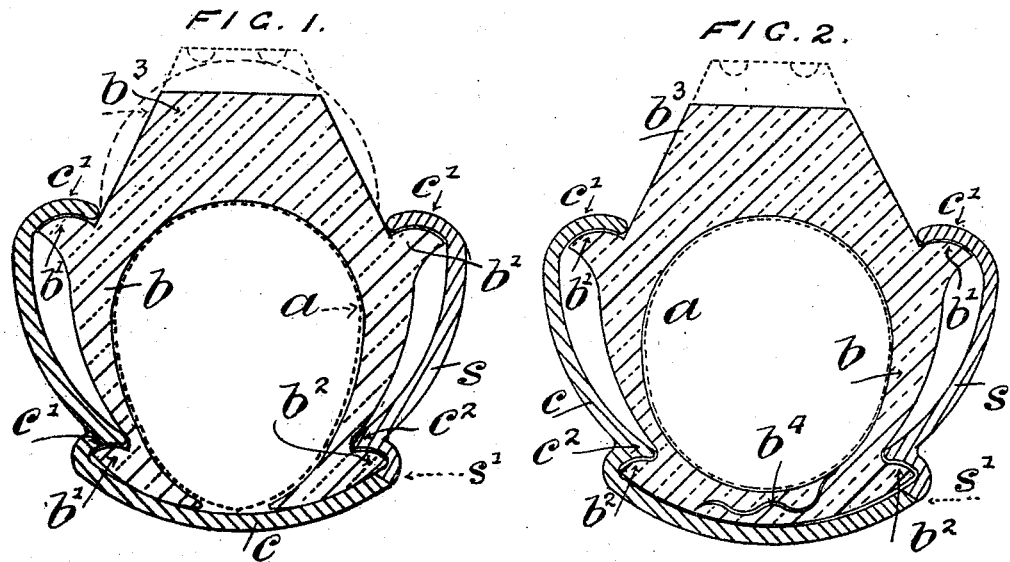
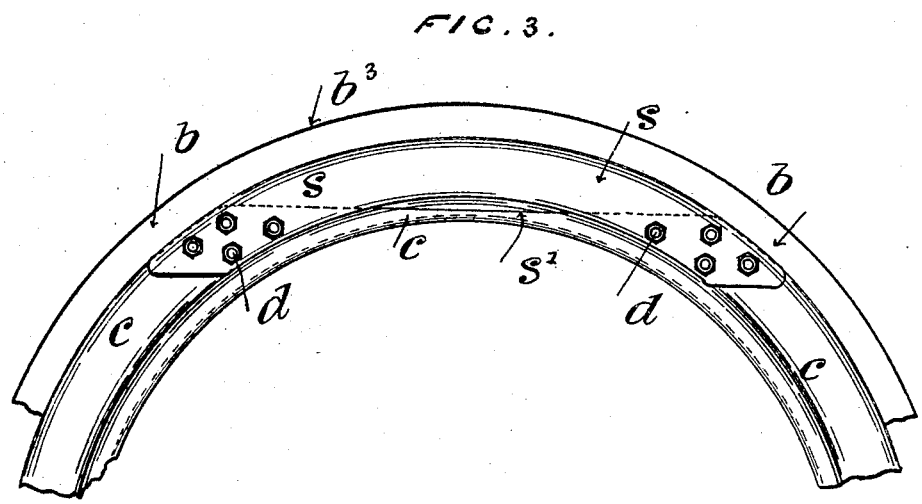
WITNESSES.
INVENTOR
Joseph Butler
By his Attorneys

UNITED STATES PATENT OFFICE.

JOSEPH BUTLER, OF ALTRINCHAM, ENGLAND.

TIRE AND RIM.

No. 796,894.        Specification of Letters Patent.        Patented Aug. 8, 1905.

Application filed January 10, 1905. Serial No. 240,436.

*To all whom it may concern:*

Be it known that I, JOSEPH BUTLER, printer, a subject of the King of Great Britain, residing at 105 George street, Altrincham, in the county of Chester, England, have invented new and useful Improvements in and Connected with Pneumatic Tires and Wheel-Rims, of which the following is a specification.

This invention relates to new constructions of pneumatic tires and rims, more particularly for motor-cars and motor-vehicles, but where of light form useful for velocipedes or other small vehicles.

I propose under this invention to locate the pneumatic cushion to a great extent within the rim and to provide for a firm locking connection between the tire-cover and rim by having interlocking means at two points on either side of the rim, and I also make a segment or segments of the rim removable for getting the tire into position. The tire may either be provided with an air-tube or be of the tubeless type.

I will describe the improvements in detail with the aid of the figures on the annexed sheet of drawings.

Figure 1 is a section of a tire and rim in accordance with my invention, showing the tire-body located well within the rim, the double locking arrangement, and the removable section of rim. Fig. 2 is a section of a modified form of tire containing the three salient points of improvement, the construction being suitable either for use with an air-tube or as a tubeless tire. Fig. 3 is a partial view of the rim in side elevation and shows the removable segment.

In the usual construction of pneumatic tire the tire-cover projects well beyond the rim to which the cover is secured, and practically the whole of the pneumatic surface is exposed to the road, so that punctures are of frequent occurrence. Under my invention I house the pneumatic cushion $a$ within, or to a great extent within, the rim, so that said pneumatic cushion is incased, or to a great extent incased, by the rim and protected thereby. The pneumatic cushion $a$ presses out and clear of the rim a continuous or other wearing tread or periphery $b^3$ of a cover or envelop $b$, so that on inflation said wearing tread or periphery $b^3$ is forced out and stands clear of the rim and bears on the road. The periphery or tread $b^3$ of the tire or cover $b$ is formed or molded of such a shape and with such a thickness of rubber or other material or materials that in the event of collapse of the incased pneumatic cushion $a$ sufficient rubber or other tread $b^3$ shall yet project beyond the rim as will keep the latter clear of the ground. By so forming the cover or envelop sufficiently thick all risk of injury to the rim in the case of deflation is obviated and a journey may be completed on the thickened annular tread or periphery $b^3$ of a collapsed tire in the event of repair of the pneumatic cushion being impossible.

In order to house the pneumatic cushion $a$ and to secure the cover or tire $b$, I arrange to have interlocking means at two points within the rim and on either side thereof. For this purpose I use a rim $c$ formed with two overhangs $c'$ $c^2$ on either side, and the tire or cover $b$ is fashioned with two annular beads or projections $b'$ $b^2$, which when the tire or cover is in position engage the two overhangs $c'$ $c^2$ on either side. The two interlocking edges on either side of the rim form a most secure locking means and effectually prevent the tire being wrenched off. To enable me to get the tire or cover $b$ into position on the rim, I form the rim with one or more removable segments $s$, which when removed expose the tire for a portion of its circumference down to the base $s'$, and this facilitates the removal or replacing of the tire. The removable segment or segments $s$ is or are made to fit closely to the rim and to correspond in contour, and such removable segment or segments is or are firmly bolted to the rim by bolts and nuts $d$. To remove the tire or cover $b$, the nuts $d$ are taken off, and the segment or segments can then be removed and the tire or cover manipulated and taken off.

My invention is not only applicable to a tire having an air-tube, but may be useful as a tubeless tire, and in Fig. 2 I show a section of my improved tire and rim similar to that shown in Fig. 1; but in this case the meeting edges $b^4$ of the tire or cover $b$ are fluted and overlap, and this makes a good joint, enabling me to dispense with an air-tube, so that the tire would in such case be tubeless. Soft soap may be used for making a good joint at the junction of the fluted extremities at $b^4$. If desired, I may, however, use an air-tube with the form of tire shown in Fig. 2.

Tires made according to this invention comprise a housed pneumatic cushion pressing out a wearing tread, double interlocking means between tire or cover and wheel-rim, and a removable segment which allows the tire or cover to be more readily withdrawn and got into position.

Tires made according to this invention are much less liable to puncture and are more firmly secured to the rim, while their use tends to lessen the risk of side slip.

I declare that what I claim is—

1. In combination in a pneumatic tire, a pneumatic cushion located within a rim and having an air-tube, a tire-cover, a tread or periphery for such tire-cover, double locking-beads on said tire-cover, a rim having double overhangs on either side, and a removable segment or segments for such rim, substantially as described and shown with reference to Figs. 1 and 3.

2. In combination in a pneumatic tire, a tire-cover, an air-cushion located within the rim, double locking beads or ribs one either side of said cover, overlapping fluted edges, a rim having double overhangs on each side, and a removable segment or segments for such rim, all substantially as described and shown with reference to Figs. 2 and 3.

In testimony whereof I have signed my name to this specification in the presence of two subscribing witnesses.

JOSEPH BUTLER.

Witnesses:
 RICHARD WEBSTER IBBERSON,
 ALFRED YATES.